United States Patent

[11] 3,592,436

[72] Inventors Wesley Miles Chandler;
 Paul Fred Heuser, both of Saint Paul, Minn.
[21] Appl. No. 716,806
[22] Filed Mar. 28, 1968
[45] Patented July 13, 1971
[73] Assignee Wilbert, Inc.
 Broadview, Ill.

[54] BURIAL VAULT MOLD WITH HANDLE POSITIONING MEANS
6 Claims, 9 Drawing Figs.

[52] U.S. Cl. .................................................. 249/94,
 25/130 B, 249/97
[51] Int. Cl. ...................................................... E04h 13/00
[50] Field of Search ........................................... 249/91, 93,
 94, 96, 97, 142, 144; 25/130 A, 130 B, 130 S

[56] References Cited
UNITED STATES PATENTS

| 1,516,535 | 11/1924 | Johnson | 249/144 X |
| 3,350,051 | 10/1967 | Haase et al. | 249/91 |
| 3,380,703 | 4/1968 | Zastrow | 25/130 (B) X |

*Primary Examiner*—J. Spencer Overholser
*Assistant Examiner*—John E. Roethel
*Attorney*—Frank R. Thienpont ABSTRACT: A burial vault cover mold having fixture means associated therewith for holding a plurality of cover handles in place while the cover is being poured so that the handle will be imbedded in a predetermined position in the finished molded article.

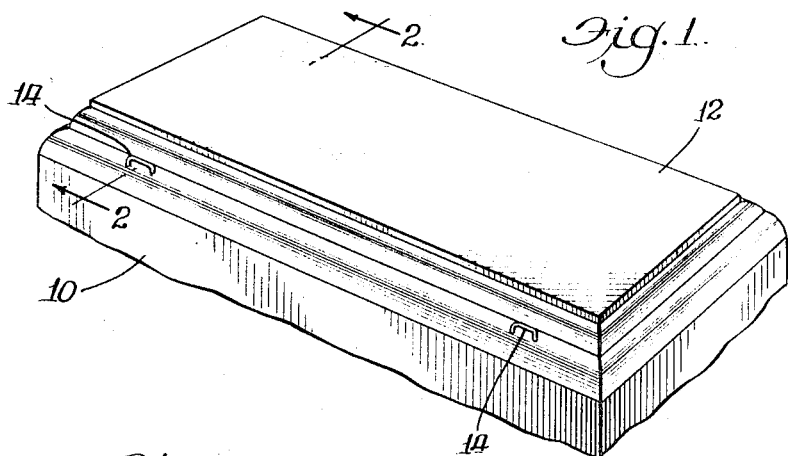
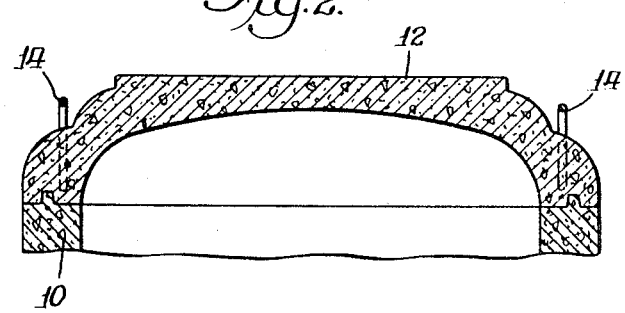
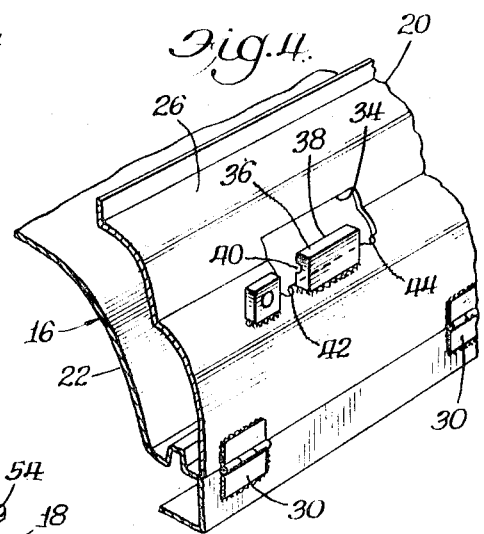
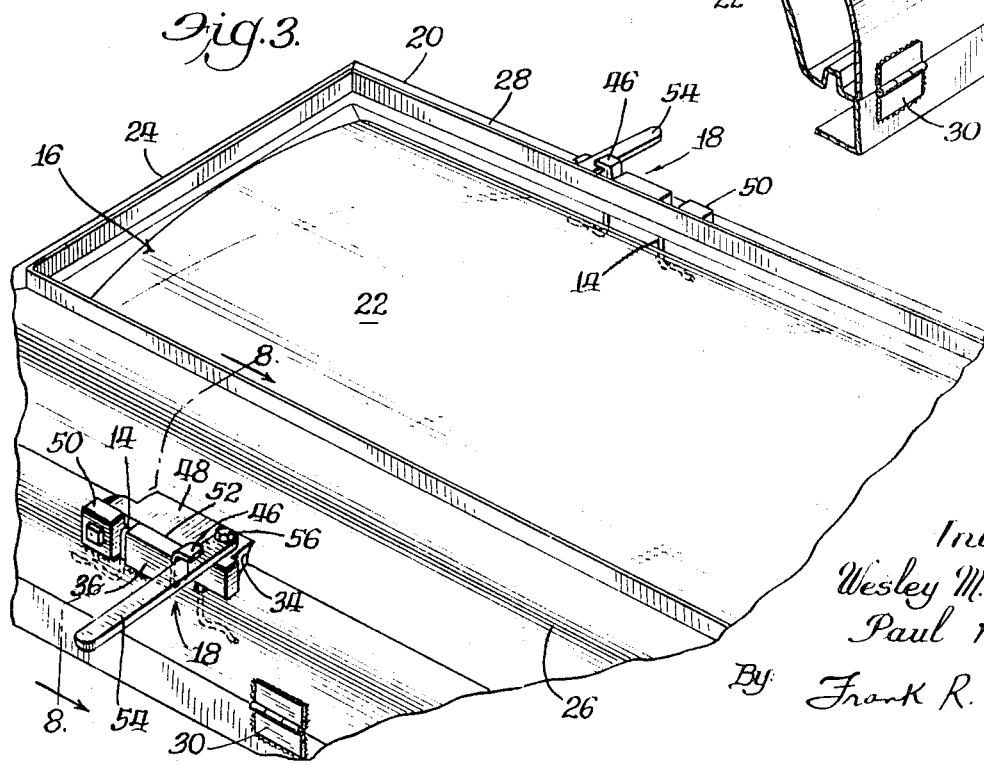

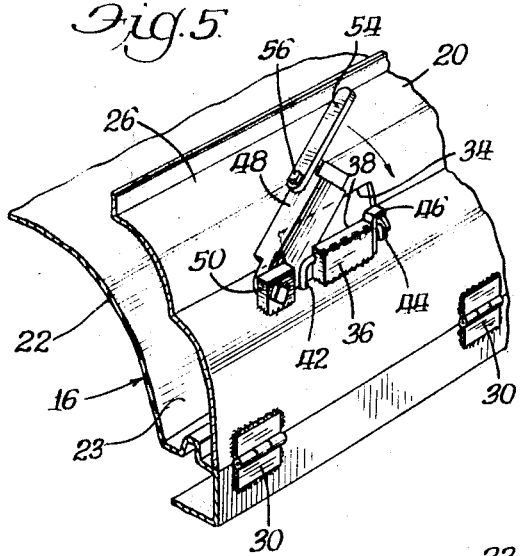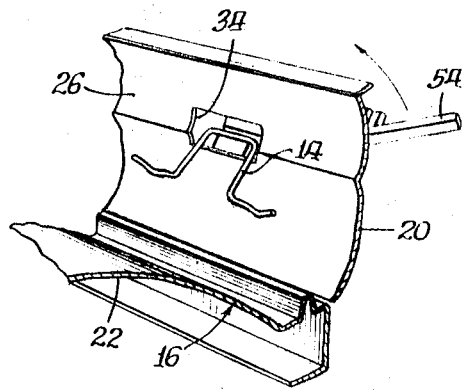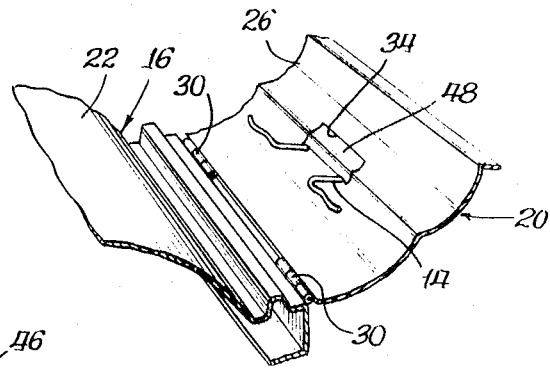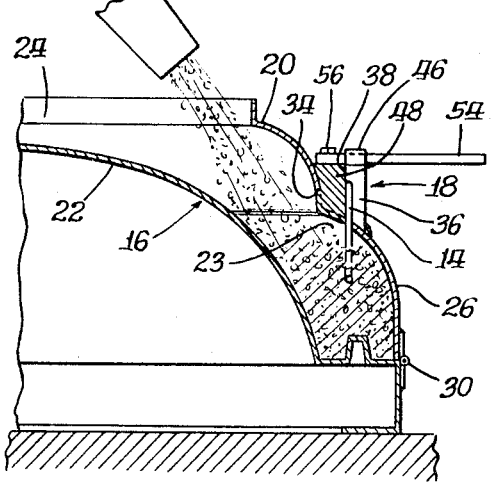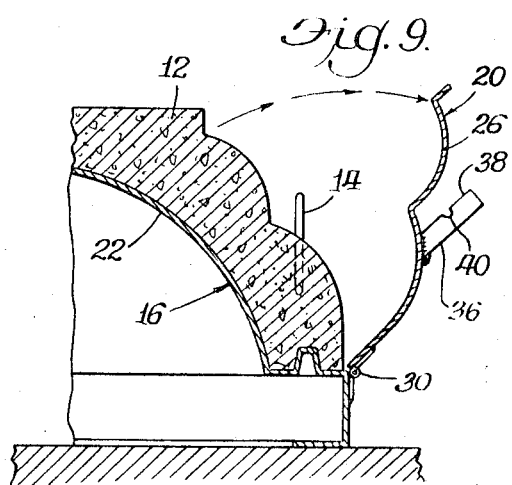

BURIAL VAULT MOLD WITH HANDLE POSITIONING MEANS

This invention relates to burial vaults and more particularly to a burial vault cover mold having means associated therewith for positioning handles in the cover material while the cover is being formed in the mold.

The principal object of this invention is to provide means for positioning a handle in a burial vault cover while the latter is being formed in a mold.

Another object is to provide means in association with a burial vault cover mold for positioning a cover handle while the cover is being poured.

Another object is to provide a device by which a vault cover handle may be positioned in relation to a mold section.

A still further object is to provide in conjunction with a vault cover mold section means for holding a vault cover handle in place while the cover is being poured including means for positioning the handle in a predetermined position and clamping means for holding the handle securely against any movement while the cover material is being poured into the mold.

The above and other objects and advantages of the invention will be more readily apparent when read in connection with the accompanying drawings in which:

FIG. 1 is a view in perspective of a portion of a burial vault and a cover therefor;

FIG. 2 is a sectional view in elevation taken along line 2-2 of FIG. 1 showing a burial vault cover and handles imbedded in the cover material;

FIG. 3 is a view in perspective showing a portion of a metal mold used to form a burial vault cover of the type shown in FIGS. 1 and 2 including fixtures in closed position used for positioning wire handles in the vault cover;

FIG. 4 is a view in perspective of a portion of the burial vault cover mold of FIG. 3 showing a portion of a fixture for positioning a cover handle;

FIG. 5 is a view in perspective of the device shown in FIG. 4 and showing a clamping mechanism in open position;

FIG. 6 is a perspective view of a portion of the cover mold in the open position with a wire handle in place and the clamping portion of the handle holding fixture in an open position;

FIG. 7 shows the portion of the cover mold shown in FIG. 6 in an open position with a wire handle in place and the clamping portion of the handle holding fixture in a closed position;

FIG. 8 is a sectional view in elevation taken along line 8-8 of FIG. 3 of the burial vault cover mold with a wire handle in place showing concrete material being poured into the mold and around the wire handle; and FIG. 9 is a sectional view in elevation of a portion of a finished burial vault cover showing the handle in place and the top mold section opened.

Referring now to the drawings, FIG. 1 shows the upper cutaway portion of a burial vault 10 with its cover 12. A plurality of handles 14 are secured in the cover, usually two on each side. These may be generally U-shaped. The most convenient way of securing the handles in the cover is to have them embedded in the concrete material of which the cover is made. It is desirable that these handles 14 be positioned in place while the cover is being poured in a mold so that when the cover material, such as concrete, sets, the handles will be imbedded therein in their desired position.

The vault cover is made by pouring concrete material into a mold form 16. This invention relates particularly to providing a plurality of fixtures 18 associated with the mold form 16 for prepositioning the handles 14.

The mold form 16 comprises generally upper and lower portions 20 and 22 defining a cavity 23 therebetween. The upper portion 20 may be divided into four upper mold sections - two end sections 24 and two side sections 26 and 28. The four upper mold sections each are pivotally mounted on the lower portion 20 as shown by the hinge arrangement 30, so that they may be swung open after the concrete material poured into the mold has set. The two end sections 24 are similarly pivotally mounted. The four upper mold sections when in a closed position define a large rectangular opening 32 in the top of the mold form 16 into which the vault cover material is poured.

In order to have the vault cover handles embedded in the concrete vault cover in the desired position, we have provided in the two upper mold sections 26 and 28 a plurality of fixtures 18, one for each handle to be molded in place. Since these fixtures are all the same, only one associated with mold section 26 will be described. An opening 34 is formed in upper mold section 26 through which the upper portion of a handle 14 may extend. Alongside opening 34 a positioning lug 36 is fixed to the mold section by appropriate means such as by welding. As here shown, the positioning lug 36 has a substantially vertically extending face 38 when the mold section is in a closed position as shown, for example, in FIGS. 4, 5 and 8. A horizontally extending slot 40 is formed in the face 38 to receive the horizontally extending portion of handle 14. Small notches or recesses 42 and 44 may be formed in the mold section alongside opening 34 to retain the two vertical portions of handle 14 in the desired position. It will be appreciated that the positioning lug 36 can be connected to the mold section 26 in a way that face 38 is disposed substantially vertical when the mold section 26 is in a closed position or at any other desired angle. The depth of slot 40 and notches 42 and 44 is such that a clamping member, to be subsequently described, will hold the handle snugly in place with no movement in any direction. A latch retaining member 46 is attached to the upper portion of lug 36 for purposes to be later described.

A clamping member 48 is pivotally mounted on the upper mold section 26 by means of pivotal mounting 50. The clamping member 48 is an elongated member constructed with a face portion 52. When clamping member 48 is in a closed position, the face portion 52 will be flush or substantially in sliding contact with face 38 of the positioning lug 36 as seen in FIG. 8, thereby preventing movement of the handle 14.

The bottom surface 53 of the clamping member 48 may be appropriately contoured so that when the clamping member is in a closed position, the bottom surface 53 will fit the contour of the underside of the mold section 26 as clearly seen in FIG. 7. It will also be apparent from FIG. 7 that opening 34 will be completely closed when clamping member 48 is in its closed position. Thus there will be no break or interruption in the contour of the upper surface of the poured vault cover.

A latching arm 54 is pivotally connected to the clamping member 48 at 56 so that it may be swung into locking engagement with latch retaining member 46 to hold the clamping member in a secured position. This holds the handle 14 securely in place and also prevents the poured material from moving upward through opening 34.

It will be appreciated that a clamping member could be mounted in other ways on the upper mold section to secure the handle in place on the positioning lug. A slide member, for example, could be used which could be moved into a securing position from the left or right.

While the fixture for positioning the handle is described herein as being for use in conjunction with a burial vault cover, it will be recognized that it could be used with other parts of a vault mold structure where it might be desirable to incorporate a handle in the vault structure.

While the operation of the handle positioning means undoubtedly is apparent from the foregoing description of the structure, its operation will be summarized briefly. Before concrete material is poured into the cover mold, wire handles 14 are positioned in each of the fixtures 18. A handle 14 may be placed in position in slot 40 and recesses 42 and 44 while the upper mold section 26 is in an open position as shown in FIG. 6. The clamping member 48 is moved into a closed position as shown by the arrow in FIG. 5, and when closed, the latching arm 54 is moved into a securing position as seen in FIG. 3. FIGS. 7 and 8 illustrate clearly the position of the handle 14 when secured in place. When the mold cavity has been filled with concrete as indicated by the arrows in FIG. 8 and the concrete has set, the latching arm 54 is unlatched, the clamping member 48 raised to an open position and the upper mold section 26 swung open as indicated in FIG. 9 to permit the vault cover 12 to be lifted from the mold.

Thus it will be seen that this invention advantageously provides a convenient and simple means associated with a mold section for positioning handles in a burial vault cover while the latter is being poured in a mold. It eliminates the necessity of a separate operation for installation of the handles. Furthermore, the device employed assures that the handles are placed exactly in a predetermined position. In addition, the device disclosed prevents the handles from being loosened or jostled during the vibrating of the cement during the pouring process or when struck by a trowel while the cement is being spread or otherwise moved about in the mold.

While a preferred embodiment of the invention has been disclosed, it is to be understood that the invention is not limited thereto as other variations will be apparent to those skilled in the art, and the invention is to given its fullest possible interpretation within the terms of the following claims.

We claim:

1. In a burial vault mold having means for supporting a handle in the burial vault material while the material is being poured into the mold the combination comprising:
   an upper mold section;
   a lower mold section operatively associated with said upper mold section:
   means defining an opening in said upper mold section for receiving a handle therethrough;
   means secured to said upper mold section adjacent said opening means for positioning the handle in a predetermined position in said opening means as it extends through said opening means and into the interior of said mold;
   clamping means being movable to open and closed positions, said clamping means including first means for cooperating with said positioning means to clamp the handle in place while the vault material is being formed, and second means for closing said opening defining means;
   said handle positioning means and said clamping means being mounted on said upper mold section;
   means pivotally connecting said upper and lower mold sections for pivoting said upper mold section, said clamping means and said handle positioning relative to said lower mold section whereby when the molding operation is completed and said clamping means is moved to the open position, said upper mold section together with said handle positioning means and said clamping means are swung to an open position about said pivotal connection means without interfering with the handle member extending through said opening means.

2. The combination of claim 1 wherein
said handle positioning means includes a lug secured to the mold section, said lug having recess means formed therein for retaining the handle in a predetermined position.

3. The combination of claim 1 including
releasable securing means for securing the clamping means in place.

4. The combination of claim 1 wherein
said clamping means is pivotally mounted on said upper mold section and is adapted to be swung into place.

5. The combination of claim 1 including
means defining recess means associated with said upper mold section and said positioning means for receiving the handle therein;
said clamping means being effective to secure the handle in said recess means.

6. The combination of claim 1 wherein
said positioning means includes a positioning member secured to said upper mold section, and means defining a first face portion on said positioning member lying in a plane substantially parallel to the plane of the intended position of the handle, and further including
recess means formed in said first face portion for receiving the handle therein, and
means defining a second face portion on said clamping means and adapted to cooperate with said first face portion of said positioning member for securing the handle in place with respect to the mold section.